Sept. 5, 1967  J. B. DAMONTE ET AL  3,340,535
CIRCULAR POLARIZATION CASSEGRAIN ANTENNA
Filed June 16, 1964  2 Sheets-Sheet 2
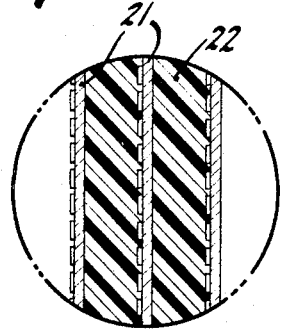
FIG·3
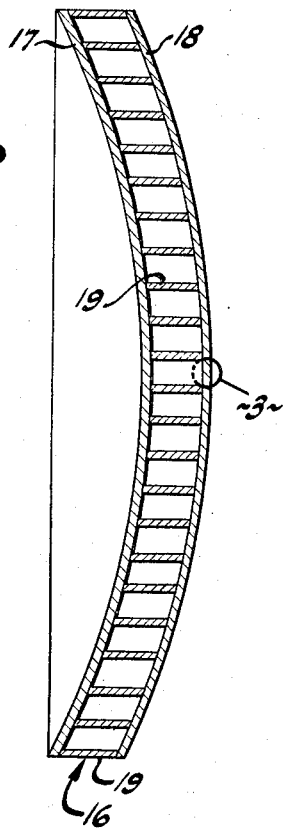
FIG·2
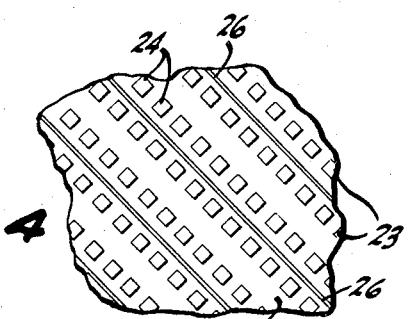
FIG·4
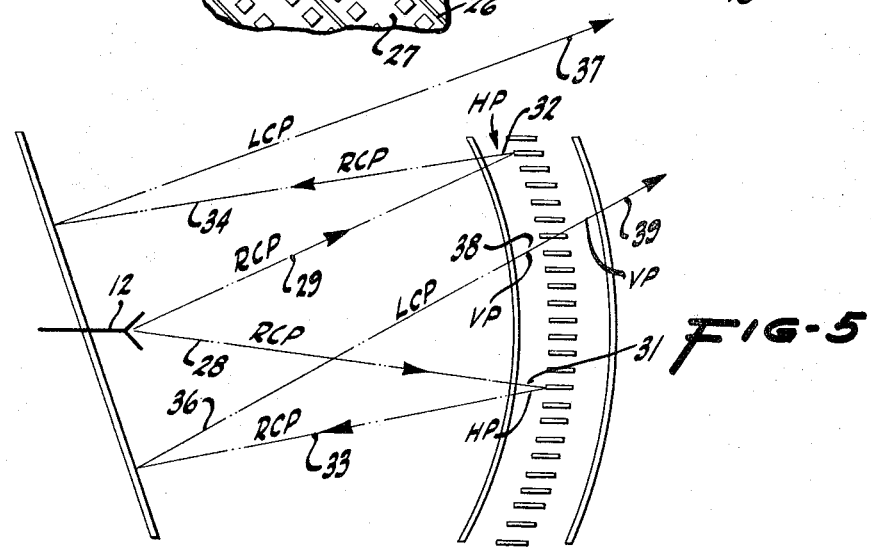
FIG·5
INVENTORS
JOHN B. DAMONTE
JOHN A. KOERNER
BY
Lippincott, Ralke & Henchicson
ATTORNEYS

United States Patent Office 3,340,535
Patented Sept. 5, 1967

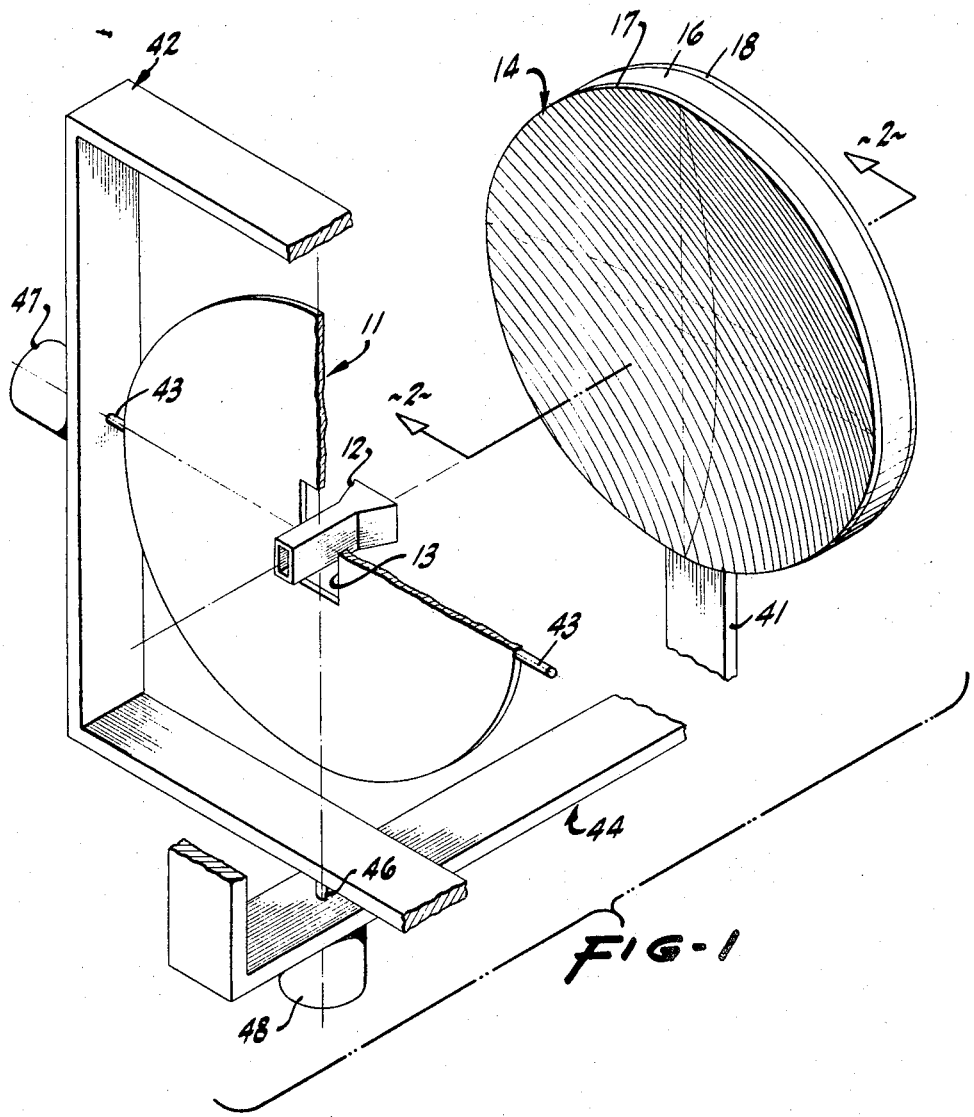

3,340,535
CIRCULAR POLARIZATION CASSEGRAIN ANTENNA
John B. Damonte and John A. Koerner, Belmont, Calif., assignors to Textron, Inc., Belmont, Calif., a corporation of Rhode Island
Filed June 16, 1964, Ser. No. 375,558
7 Claims. (Cl. 343—756)

The present invention relates to antenna systems of the Cassegrain or multi-reflector type, and is particularly directed to a circular polarization Cassegrain antenna having a sub-reflector which appears to be transparent to circularly polarized electromagnetic waves reflected from a main reflector such that the sub-reflector does not present a blocked aperture thereto.

Circularly polarized antennas are advantageous in various signal transmission applications. For example, in the transmission of signals through the ionosphere, circularly polarized waves are desired inasmuch as there is no problem of orientation between transmitting and receiving antennas as exists in the case of linearly polarized waves which are rotated by unpredictable amounts in passing through the ionosphere. The use of circularly polarized waves are also desirable from the standpoint of the rain clutter suppression which can be effected therewith. In this latter regard, rain drops act as flat reflectors to signals in the upper frequency ranges and effect the generation of noise signals which are superimposed upon a main reflection or echo signal. With linearly polarized waves, it is difficult to discriminate between the rain clutter noise signal and echo signal because the noise has a random polarization. With circularly polarized waves, however, the sense of polarization of the noise due to rain clutter is generally distinct from the sense of polarization of the echo signal such that it then becomes an easy matter to discriminate therebetween. Despite the apparent advantages resulting from the use of circularly polarized waves in the transmission of signals, such use has been severely limited where antennas of the Cassegrain or multi-reflector variety have been involved. More particularly, Cassegrain antennas include a sub-reflector which is positioned forwardly of a main reflector, and a primary feed source illuminates the sub-reflector with electromagnetic waves such that the waves are reflected from the sub-reflector upon the main reflector, wherefrom the waves are re-reflected into free space. The sub-reflector accordingly usually constitutes a blocked aperture in the beam which is re-reflected from the main reflector. Although various Cassegrain arrangements have been devised such that the sub-reflector appears transparent to the waves re-reflected from the main reflector, such systems have been heretofore limited to use with linearly polarized waves. The sub-reflectors of previous circularly polarized Cassegrain antennas have been non-transparent and the blocked aperture resulting therefrom has limited the application of such Cassegrain systems to very large over-all apertures in terms of wavelengths.

The present invention overcomes the foregoing limitation by providing a circular polarization Cassegrain antenna wherein the sub-reflector is transparent to circularly polarized waves re-reflected from the main reflector to thereby eliminate the previously existing blocked aperture. The sub-reflector is so arranged that circularly polarized waves radiated from a feed source and having a first sense of polarization, for example, right circular, are reflected from the sub-reflector. The sub-reflector is, however, transparent to circularly polarized waves having an opposite sense of polarization; in this case, left circular. The waves reflected from the sub-reflector are, in turn, re-reflected from the main reflector with an inversion in the sense of polarization and the re-reflected waves, hence, have the proper sense of polarization to pass through the sub-reflector into free space. As a result, the Cassegrain antenna of the present invention provides circular polarization signal transmission without a blocked aperture. Moreover, in a preferred embodiment of the invention the main reflector is provided as a flat plate mounted for rotation about orthogonally related axes extending through the longitudinal axis of the plate. Use of a flat plate main reflector is advantageous in that scanning of the antenna beam may be effected by oscillating the relatively low inertia main reflector in alternately opposite directions about its pivot axes. Inasmuch as only the low inertia flat plate main reflector is required to move, relatively high scan rates are readily attainable. Moreover, no rotary joint or complex waveguide runs are required in the antenna system since the flat plate main reflector may be arranged to be freely movable with respect to the primary feed source. Furthermore, with a flat plate main reflector, a two-to-one multiplication in beam scan versus mechanical plate scan is obtained and, accordingly, the main reflector need scan only half as far as that of a comparable paraboloid system. An additional advantage accrues from the use of a flat plate main reflector in that the antenna may be relatively simply roll stabilized by roll stabilizing only the flat plate main reflector. In this regard, with conventional airborne antennas, reflection signals from the ground are generally distorted due to rolling of the craft, and to overcome this difficulty it is the usual practice to inertially stabilize the entire antenna to counteract roll and maintain the antenna in a fixed position relative to the ground. By employment of a flat plate main reflector, it is only necessary to inertially stabilize this single component of the antenna with a resultant material simplification in the stabilizer system.

The invention will be better understood upon consideration of the following description in conjunction with the accompanying drawings, wherein:

FIGURE 1 is a perspective view with portions broken away of a preferred embodiment of a circular polarization Cassegrain antenna in accordance with the present invention;

FIGURE 2 is a sectional view taken at line 2—2 of FIGURE 1, illustrating particularly the construction of the sub-reflector of the antenna;

FIGURE 3 is an enlarged fragmentary sectional view depicting a preferred construction of polarization conversion elements of the sub-reflector;

FIGURE 4 is an enlarged fragmentary end view of the polarization conversion element; and FIGURE 5 is a schematic illustration depicting the paths and polarizations of electromagnetic waves at various points of the antenna system.

The circular polarization Cassegrain antenna of the present invention comprises, in brief, a main reflector, preferably in the form of a flat plate, and a sub-reflector coaxially spaced from the main reflector. A primary feed source extends centrally through the main reflector and serves to illuminate the sub-reflector with circularly polarized waves of electro-magnetic energy. The sub-reflector includes grating reflector means for reflecting incident linearly polarized waves polarized in a given plane (e.g., horizontal) while permitting free passage therethrough of incident linearly polarized waves polarized in a second plane rotated 90° with respect to the first plane (e.g., vertically polarized waves). The sub-reflector further includes polarization conversion means disposed on opposite sides of the grating reflector means, and these conversion means are arranged to appropriately convert circularly polarized waves to linearly polarized waves, and vice versa. In this regard, the polarizer means convert circularly polarized waves having the sense of polarization radiated from the feed source to linearly polarized waves polarized in the plane to which the grating means is reflective. The reflected linearly polarized waves are transmitted through the polarization conversion means, and as a result are reconverted to circularly polarized waves having the original sense of polarization radiated from the feed source. The reflected circularly polarized waves are directed upon the main reflector and are re-reflected therefrom with an inversion in the sense of their polarization. A portion of these re-reflected circularly polarized waves with the opposite sense of polarization to that of the waves originally radiated from the feed source are transmitted directly into free space. The remaining portion of these re-reflected electromagnetic waves, however, impinge the sub-reflector and are converted by the polarization conversion means thereof to linearly polarized waves polarized in the plane to which the grating reflector means is passive. The linearly polarized waves pass through the grating reflector means and through the second polarization conversion means, the latter converting the linearly polarized waves to circularly polarized waves having the opposite sense of polarization to that of the waves originally radiated by the feed source. The sub-reflector thus functions as if it were transparent to the circularly polarized waves re-reflected from the main reflector. The sub-reflector may further include means for adjusting the phase of waves transmitted therethrough to equality with the phase of waves re-reflected directly into space from the main reflector.

Considering now the circular polarization Cassegrain antenna in greater detail with respect to an exemplary structural embodiment thereof and referring particularly to FIGURE 1, the main reflector is indicated at 11 and will be seen to be provided as a thin circular metallic plate. The primary feed source is preferably in the form of a feed horn 12 which extends centrally through the flat plate main reflector 11, for example, freely through a central aperture 13 thereof. A sub-reflector 14 is coaxially spaced forwardly from the main reflector 11 and feed horn 12, and such sub-reflector includes a central parabolic grating reflector 16 with polarization conversion grids 17 and 18 secured to the opposite faces of the grating reflector and contoured thereto. The grating reflector is preferably provided as a plurality of horizontal parallel grating strips 19 having appropriate arcuate contours to define a paraboloid and incased in rigid assembly in, for example, Fiberglas, or the like. The focus of this grating reflector is located at the output of the feed horn 12. As is well known, such a grating reflector reflects horizontal linearly polarized waves, but is passive to vertically linearly polarized waves. Grating reflectors of this type have been employed heretofore as transparent sub-reflectors in Cassegrain antenna systems designed for linear polarization operation. In such systems, electromagnetic waves radiated from a feed source are linearly polarized in a given plane, for example, horizontal, and reflected from the sub-reflector grating upon the main reflector. The main reflector is arranged to reflect the waves with a 90° rotation of their plane of polarization, the re-reflected waves being then, for example, vertically polarized. As a result, the re-reflected waves pass through the sub-reflector grating into free space. Such previous systems for linear polarization operation are not, of course, operable with circularly polarized waves inasmuch as circularly polarized waves are comprised of two orthogonally related linear wave components. One component would, hence, be reflected from the grating reflector, while the other would be transmitted therethrough such that linear polarized waves would emanate from the antenna rather than circularly polarized waves as originally radiated from the feed source. The grating reflector 16 in combination with the conversion grids 17 and 18, however, provide a transparent sub-reflector for circular polarization operation.

The polarization conversion grids 17 and 18 may be provided as any one of various means which are operable to convert circularly polarized electromagnetic waves having a first sense of polarization, for example, right circular, to linearly polarized waves polarized in a first given plane, for example, horizontal, and vice versa, and to convert circularly polarized waves, having a second sense of polarization opposite to the first, to linearly polarized waves polarized in a second plane rotated 90° with respect to the first plane of polarization, for example, vertical, and vice versa. To accomplish the foregoing, the polarization conversion grids 17 and 18 are preferably each provided as a plurality of grid elements 21, in the present case, three elements, secured together in a sandwich configuration with layers 22 of Fiberglas foam, or equivalent dielectric, interposed therebetween. Each grid element 21 is defined by a plurality of parallel spaced rows of spaced apart metallic rectangular plates 24 and parallel metallic wires 26 interposed between rows of plates and secured to a dielectric backing sheet 27. In this regard, the grid elements 21 may advantageously be provided as printed circuit boards with the plates 24 and wires 26 etched away from the dielectric backing sheets thereof. The rows 23 and wires 26 of the elements 21 of the grids as secured and contoured to the faces of the grating reflector 16 are oriented at 45° to the strips 19 of the grating reflector. The plates and wires, moreover, respectively represent capacitive and inductive shunt susceptances to incident electromagnetic waves. To wave components perpendicular to the rows 23 and wires 26, the susceptance is purely capacitive whereas to wave components parallel to the rows and wires, the susceptance is a shunt combination of capacitive and inductive susceptances. The susceptances are so selected that at a design operating frequency, the capacitive and inductive susceptances of the shunt combinations thereof cancel each other and as a result the grid elements are invisible to wave components parallel to the rows of plates and wires and capacitive to wave components perpendicular thereto. Consequently, the grids introduce a 90° phase difference between incident parallel and perpendicular wave components. It will, thus, be appreciated that components of a circularly polarized wave parallel and perpendicular to the rows of plates and wires of the grid elements 21 have a 90° phase difference introduced therebetween in passing through either of the grids to thereby emerge as linearly polarized waves polarized in either a horizontal or vertical plane, depending upon the sense of polarization of the incident circularly polarized waves. In accordance with the invention hereof, the sense of polarization of the circularly polarized waves radiated from the feed horn 12 is selected to correspond to that which in passing through the elements of grid 17 is converted to linearly polarized waves which are polarized in the horizontal plane and, hence, are reflected from the grating reflector 16. Linearly polarized waves which are polarized in either a horizontal or vertical plane and which are incident upon the grid elements 21 have components which are respectively parallel and perpendicular to the rows of plates and wires thereof. The elements introduce a 90° phase difference between these components such that the emergent waves from the grid are circularly polarized. The sense of polarization of the emergent circularly polarized waves depends upon whether the incident linearly polarized waves are polarized in a vertical plane or in a horizontal plane. In the presently discussed case, horizontally polarized linear waves are converted by the grid elements to circularly polarized waves having the same sense of polarization as circularly polarized waves which are converted to horizontally polarized waves in passing through the grid elements. Thus, the horizontally polarized waves reflected from the grating reflector 16 in passing through the grid 17 are converted to circularly polarized waves having the same sense of polarization as the waves radiated from the feed horn 12. The reflected circularly polarized waves impinge the main reflector 11 and in being re-reflected therefrom are inverted in the sense of their polarization. Such re-reflected circularly polarized waves having the opposite sense of polarization from that of the waves originally radiated from the feed horn 12 upon impinging the grid 17 are, hence, converted to vertically polarized waves. These vertically polarized waves pass through the grating reflector 16 and, in turn, impinge the grid 18. The grid 18 introduces the 90° phase difference between the parallel and perpendicular components of the vertically polarized waves with the proper sense to produce an emergent circularly polarized wave having the same sense of polarization as the waves reflected from the main reflector 11.

The foregoing operation of the sub-reflector 14 will be better understood upon considering the specific case depicted in FIGURE 5 wherein the feed horn 12 radiates right circularly polarized (RCP) waves as depicted by the rays 28 and 29. Rays 28 and 29 upon passing through the converter grid 17 are converted to horizontal linearly polarized (HP) waves, as indicated at 31 and 32, which impinge the grating reflector 16 and are reflected therefrom back through the converter grid 17. The emerging waves are right circularly polarized, as indicated by the rays 33 and 34, and are received by the main reflector 11. The right circularly polarized waves 33 and 34 are converted to left circularly polarized (LCP) waves 36 and 37 in being re-reflected from the main reflector. The left circularly polarized waves represented by the ray 37 are directed into free space whereas those represented by the ray 36 impinge the converter grid 17 and are converted to vertically polarized linear (VP) waves, as indicated at 38. The vertically polarized waves pass through the grating reflector 16 and impinge the converter grid 18 to be, in turn, converted to left circularly polarized waves, as indicated by the ray 39. Thus, all of the electromagnetic energy reflected from the main reflector 11 is in the form of left circularly polarized waves whether the waves are transmitted directly into space such as in the case depicted by ray 37, or transmitted through the transparent sub-reflector 14, as indicated by the ray 29.

It will be appreciated that the waves transmitted into space through the sub-reflector 14 may be delayed in phase compared to those transmitted directly into space from the main reflector. In the event that it is necessary to compensate for this effect, the sub-reflector 14 may be designed in such a fashion as to shift the phase of waves transmitted therethrough by an equal and opposite amount to the phase difference between the directly and indirectly transmitted waves. In this regard, the grating reflector 16 may be arranged to function as a short section of waveguide whose phase velocity is greater than that of light in free space by the employment of an appropriate dielectric as the material in which the grating strips 19 are incased. The length of the resulting waveguide section (width of the grating strips 19) is then chosen to exactly compensate for the phase delay introduced by the converter grids 17 and 18 whereby waves transmitted directly from the main reflector into free space and waves transmitted through the sub-reflector into free space have equal phase. Alternatively, the susceptances of the grid elements 17 and 18 may be chosen to introduce an equal phase shift to both parallel and perpendicular wave components transmitted therethrough, while simultaneously introducing the previously noted 90° phase difference therebetween. Such a phase shift is selected to be equal and opposite to that between the directly and indirectly transmitted waves.

Various mounting arrangements may, of course, be employed with the antenna of the present invention to provide for scanning of the circularly polarized beam transmitted therefrom. In this regard, it should be noted that the employment of a flat plate main reflector 11 facilitates scanning with a minimum complexity of the scanning mechanism and provides other advantages. More particularly, to facilitate scanning, the main reflector 11 is preferably mounted for rotation about orthogonal axes perpendicularly intersecting the axis of the feed horn 12, and therefore the longitudinal axis of the main reflector. The sub-reflector 14, on the other hand, may be mounted in fixed position. Scanning of the antenna beam in either elevation or azimuth is then simply accomplished merely by oscillating the flat plate main reflector 11 in opposite directions about the respective orthogonally related axes of rotation. Complex rotary joints are not required between the feed horn 12 and main reflector 11 inasmuch as the former extends freely through the slot 13 in the latter to permit relative movement therebetween. The sub-reflector 14 may be mounted in fixed position, as by means of supports 41, within a radome, or the like. The main reflector 11 may be mounted by means of a gimbal arrangement including a frame 42, to the sides of which the main reflector 11 is pivotably secured as by means of horizontal stub shafts 43. Frame 42 is, in turn, pivotably secured within a second frame 44 as by means of vertical stub shafts 46. The antenna beam may, thus, be scanned in elevation by pivoting the flat plate main reflector 11 alternately up and down about the axis of the stub shafts 43. Similarly, the beam may be scanned in azimuth by rotating the frame 42 alternately in opposite directions about the axis of the stub shafts 46. Driven scanning in the foregoing manner may be accomplished, for example, by means of motors and associated oscillating drive mechanisms, as generally depicted by the numerals 47 and 48, respectively coupled to the stub shafts 43 and 46. By virtue of the relatively low inertia of the flat plate main reflector 11 compared to, for example, a parabolic main reflector, scanning may be readily accomplished at relatively high rates. Furthermore, by the employment of a flat plate main reflector 11, a two-to-one multiplication in beam scan relative to reflector scan is obtained such that the reflector 11 need only be scanned half as far as a paraboloid reflector of a comparable Cassegrain system to provide the same scan of the beam. As a further advantage resulting from the employment of a flat plate main reflector 11 in the antenna system of the present invention, it will be appreciated that the antenna may be roll stabilized merely by roll stabilizing the main reflector 11 and its associated gimbals mounting, rather than the entire antenna including the sub-reflector and feed source.

While the present invention has been described hereinbefore with respect to a single preferred embodiment thereof, it will be appreciated that various changes and modifications may be made therein without departing from the true spirit and scope of the invention and thus it is not intended to limit the invention except by the terms of the appended claims.

What is claimed is:

1. A circular polarization antenna comprising a primary feed source emitting circularly polarized waves of electromagnetic energy having a first sense of polarization, a sub-reflector disposed to receive said waves emitted from said source, said sub-reflector including a surface reflective to linearly polarized waves polarized in a first plane and transparent to linearly polarized waves polarized in a second plane rotated 90° from said first plane, said sub-reflector including polarization conversion grids disposed on opposite sides of said surface for converting circularly polarized waves having said first and second senses of polarization to linearly polarized waves polarized in said first and second planes respectively and converting linearly polarized waves polarized in said first and second planes to circularly polarized waves having said first and second senses of polarization respectively, and a flat plate main reflector transpierced by said feed source and disposed to receive and re-reflect waves reflected from said sub-reflector, said main reflector inverting the sense of polarization of circularly polarized waves incident thereon whereby a portion of the radiated electromagnetic energy is reflected from said main reflector directly into space as circularly polarized waves having said second sense of polarization and the remainder of said energy is reflected from said main reflector through said sub-reflector into space as circularly polarized waves having said second sense of polarization.

2. A circular polarization antenna according to claim 1, further defined by said sub-reflector including means for adjusting the phase of waves transmitted through said sub-reflector to equality with waves reflected directly into space.

3. A circular polarization antenna according to claim 1, further defined by said main reflector being mounted for rotation about orthogonal axes normal to the axis of said feed source.

4. A circular polarization antenna comprising a parabolic grating reflector for reflecting linearly polarized electromagnetic waves having a first plane of polarization parallel to the strips of the reflector and transmitting linearly polarized electromagnetic waves having a second plane of polarization perpendicular to the strips of the reflector, polarization conversion grids mounted upon and contoured to the opposite faces of said grating reflector, each of said grids including at least one grid element having parallel spaced rows of spaced-apart metallic rectangular plates and parallel metallic wires interposed between rows of said plates secured to a dielectric backing sheet, said rows of plates and said wires oriented at 45° to said strips of said grating reflector, said plates and said wires respectively representing capacitive and inductive shunt susceptances to incident electromagnetic waves, said susceptances selected to introduce a 90° phase difference between incident wave components respectively disposed parallel and perpendicular to said rows of plates and wires whereby linearly polarized waves respectively having said first and second planes of polarization are converted to circularly polarized waves having opposed first and second senses of polarization and vice versa, a feed horn disposed at the focus of said parabolic grating reflector radiating circularly polarized electromagnetic waves having said first sense of polarization, and a flat plate main reflector disposed adjacent said feed horn and having a central aperture traversed by same, said main reflector reflecting incident circularly polarized waves with an inversion in their sense of polarization.

5. A circular polarization antenna according to claim 4, further defined by means mounting said main reflector for rotation about orthogonal axes perpendicular to the axis of said feed horn.

6. A circular polarization antenna according to claim 4, further defined by said susceptances being selected to introduce predetermined equal phase shifts to both of said wave components parallel and perpendicular to said rows of plates and wires in addition to introducing said 90° phase difference therebetween, said predetermined phase shifts being such as to equalize the phases of waves reflected from said main reflector directly into free space and waves reflected from said main reflector through said grids and grating reflector into free space.

7. A circular polarization antenna according to claim 4, further defined by the width of said strips of said grating reflector thereof being selected to shift the phase of waves transmitted therethrough by an amount to equalize the phases of waves reflected from said main reflector directly into free space and waves reflected from said main reflector through said grids and grating reflector into free space.

References Cited
UNITED STATES PATENTS

| | | | |
|---|---|---|---|
| 3,084,342 | 4/1963 | Fuller et al. | 343—756 X |
| 3,195,137 | 7/1965 | Jakes | 343—756 |
| 3,267,480 | 8/1966 | Lerner | 343—911 |

ELI LIEBERMAN, *Primary Examiner.*

HERMAN KARL SAALBACH, *Examiner.*

R. D. COHN, *Assistant Examiner.*